United States Patent [19]

Kawamura et al.

[11] Patent Number: 5,676,919
[45] Date of Patent: Oct. 14, 1997

[54] METHOD FOR PRODUCING SINTERED LITHIUM OXIDE GRANULES

[75] Inventors: Hiroshi Kawamura, Oarai-machi; Shigeharu Yoshimuta, Tohkai-mura, both of Japan

[73] Assignees: Japan Atomic Energy Research Institute; Genshi Nenryo Kogyo Kabushiki Kaisha, both of Tokyo, Japan

[21] Appl. No.: 563,021
[22] Filed: Nov. 27, 1995

[30] Foreign Application Priority Data

Nov. 30, 1994 [JP] Japan .................... 6-319421

[51] Int. Cl.$^6$ .................... C01D 1/00; C01D 15/02
[52] U.S. Cl. .................... 423/641; 423/643; 423/179.5
[58] Field of Search .................... 423/641, 643, 423/179.5, 642

[56] References Cited

U.S. PATENT DOCUMENTS

| 3,321,277 | 5/1967 | Bach | 423/179.5 |
| 4,221,775 | 9/1980 | Anno et al. | 423/641 |

Primary Examiner—Steven Bos
Attorney, Agent, or Firm—Frishauf, Holtz, Goodman, Langer & Chick, P.C.

[57] ABSTRACT

High-purity, sintered spherical $Li_2O$ granules is produced by a gel precipitation technique. $Li_2CO_3$ powder is dispersed in an aqueous solution of a water-soluble resin, whose drops are transferred through a nozzle into a solidifying acetone bath. Spherical gel particles in which $Li_2CO_3$ is dispersed are formed in the acetone bath. The spherical gel particles are dried, calcined, thermally decomposed and sintered.

15 Claims, 2 Drawing Sheets

METHOD FOR PRODUCING SINTERED LITHIUM OXIDE GRANULES

BACKGROUND OF THE INVENTION

1. Field of the Invention

The present invention relates to a method for producing sintered $Li_2O$ granules. Specifically it relates to a method for producing high-purity, highly spherical sintered $Li_2O$ granules.

2. Description of Prior Art

Conventional methods for producing sintered $Li_2O$ granules include fusion granulation and tumbling granulation.

Fusion granulation employs LiOH or $Li_2CO_3$ as the starting material, which is heated and fused in a crucible and then quenched by dropping into alcohol to form granules. The granules are eventually sintered to give sintered $Li_2O$ granules with desired diameter.

Tumbling granulation comprises the step of forming the powdered starting material into granules in a rotating drum, the resultant granules are then sintered into $Li_2O$ granules with desired diameter.

However, fusion granulation risks contamination of the fused starting materials by impurities transferred from the crucible, rendering it difficult to obtain high-purity sintered $Li_2O$ granules. It is also difficult to obtain fine $Li_2O$ granules, for example, 0.1 mm in diameter, because of the relatively high viscosity of the melt at high temperatures.

The mechanism of tumbling granulation presents an inherent difficulty in forming granules of high sphericity in the rotating drum, and the sintered $Li_2O$ granules obtained tend to show nonuniform diameters. It is also difficult to obtain fine $Li_2O$ grains, for example, 0.1 mm in diameter.

SUMMARY OF THE INVENTION

The principal object of the present invention is to provide a production method of sintered $Li_2O$ granules with high purity and sphericity, which method is suitable for mass production and offers an easy way of controlling the particle diameter.

Another object of the present invention is to provide a production method of fine sintered $Li_2O$ granules, for example, 0.1 mm in diameter.

According to one aspect of the present invention, there is provided a method for producing sintered $Li_2O$ granules from Li compound, said method comprising the steps of:

(a) preparing a dispersion of powder of said Li compound in an aqueous solution of a polymeric compound;

(b) transferring drops of said dispersion through a nozzle into a solidifying bath;

(c) turning said drops into gel in said solidifying bath to form spherical gel particles in which the powder of said Li compound is dispersed in the gel of said polymeric compound;

(d) drying said spherical gel particles;

(e) calcining said gel particles after drying to form spherical $Li_2O$ particles; and (f) sintering said spherical $Li_2O$ particles.

According to one preferrd embodiment of the present invention, said solidifying bath is made of a liquid in which said Li compound is substantially insoluble, and the aqueous solution of said polymeric compound gels in said solidifying bath.

Preferablly, said Li compound is selected from a group consisting of $Li_2CO_3$, LiOH and $LiNO_3$.

According to another preferred embodiment of the present invention, said powder comprises principally $Li_2CO_3$, said solidifying bath contains principally liquid acetone, and said polymeric compound comprises principally a water-soluble synthetic resin, preferably a cationic derivative of cellulose or polyvinyl alcohol. The aqueous solution of said polymeric compound contains 3 to 12 wt % of said polymeric compound dissolved in pure water by heating.

According to still another preferred embodiment of the present invention, said nozzle is vibrated at a predetermined frequency to control the diameter of said drops by adjusting said frequency and/or volumetric flow rate of said dispersion through said nozzle.

According to still another preferred embodiment of the invention, a preliminary step to the calcination of said spherical gel particles is provided in which said spherical gel particles are preliminarily calcined at a temperature lower than the melting point of said Li compound in presence of oxygen to form spherical particles of said Li compound by eliminating said polymeric compound from said spherical gel particles, followed by another step in which said spherical particles of said Li compound are thermally decomposed substantially in vacuo to form said spherical $Li_2O$ particles.

According to a particularly preferable embodiment of the present invention, a method for producing sintered $Li_2O$ granules comprises the steps of:

(a) mixing 3 to 12 wt %, preferably 10 wt %, of a water-soluble resin capable of gelation by acetone, preferably a cationic derivative of cellulose or polyvinyl alcohol, with pure water, heating the mixture and dissolving the resin to prepare a carrier solution;

(b) preparing a dispersion of 4 weight parts or less of $Li_2CO_3$ powder in 10 weight parts of said carrier solution;

(c) transferring drops of said dispersion into an acetone bath through a nozzle;

(d) turning said drops into gel in said acetone bath to form spherical gel particles in which said $Li_2CO_3$ powder is dispersed in the gel of said water-soluble resin;

(e) drying said spherical gel particles by heating in air;

(f) preliminarily calcining said spherical gel particles after drying for 10 hours or more at a temperature in the range of 400° to 600° C., preferably at 600° C., to form spherical $Li_2CO_3$ particles;

(g) thermally decomposing said spherical $Li_2CO_3$ particles substantially in vacuo for 60 hours or more at a temperature in the range of 400° to 700° C., preferably at 600° C., to form spherical $Li_2O$ particles; and (h) subsequently raising the temperature at a rate of about 100° C./hr up to about 1100° C. and maintaining this temperature for about 4 hours to sinter said spherical $Li_2O$ particles.

Also in this case, it is preferable for said nozzle to vibrate at a predetermined frequency for controlling the diameter of said drops by adjusting said frequency and/or volumetric flow rate of, said dispersion through said nozzle.

According to the present invention, the powder of the Li compound is not directly formed into spherical $Li_2O$ particles for sintering, but the powder is rather dispersed in an aqueous solution of a polymeric compound which is unrelated to the end product $Li_2O$ with respect to chemical composition, the resultant dispersion gelating due to its differences from the solidifying bath in physical properties (e.g. viscosity and surface tension) to form spherical gel particles, which are subsequently calcined to yield spherical $Li_2O$ granules. The step of forming spherical gel particles allows high sphericity and easy control of particle diameter, and the resultant particles can have a very small diameter. Since the spherical gel particles undergo little deformation during drying and calcination, the calcined $Li_2O$ particles eventually obtained have high sphericity and a uniform diameter closely following the control.

This means that the particle size control is independent of the physical properties of the starting Li compound, such as the viscosity of the melt or the granulation characteristics of the powder-binder mixture. This enables production of sintered $Li_2O$ granules of a very small and uniform diameter. The process described above also allows production of sintered $Li_2O$ granules of high purity, because the polymeric compound as the carrier of the Li compound powder is completely removed in the calcination steps, which can be carried out in a conventional process line.

The aqueous solution of a polymeric compound, or carrier solution, used in the present invention gelates in a particular solidifying bath, and decomposes completely by heating. Dispersing powder of a Li compound uniformly in such a carrier solution and dripping the dispersion into a solidifying bath can yield spherical gel particles with high sphericity and a uniform diameter in which the Li compound powder is uniformly dispersed. Obviously it is preferable to use a carrier solution which forms gel particles having sufficient strength to retain the spherical shape during subsequent processing.

Preferablly, the liquid for the solidifying bath does not dissolve the Li compound in the suspension or dissolve the spherical gel particles. A particularly preferable example of such a liquid is acetone.

The size of drops transferred into the solidifying bath can be controlled by dripping the dispersion through, for example, a vibrating nozzle. In this case, the following relationship may be satisfied:

$$Q=(\pi/6)d^3*f$$

where Q is the volumetric flow rate of the dispersion discharged through the nozzle, d the drop diameter, and f the frequency of nozzle vibration. The drop diameter d can thus be controlled by adjusting the vibration frequency f and/or volumetric flow rate Q. A method other than the vibrating nozzle can obviously be used for drop diameter control.

When $Li_2CO_3$ powder is used as the starting material according to the present invention, liquid acetone, in which $Li_2CO_3$ is substantially insoluble, is used as the solidifying bath and a solution in pure water of a polymeric compound which gelates in acetone is used as the carrier solution. The polymeric compound is preferably decomposed completely during heating. Examples of such polymeric compounds include cationic derivatives of cellulose, polyvinyl alcohol and other water-soluble resins.

The concentration of the polymeric compound solution is preferably adjusted such that gel particles formed retain the spherical shape with controlled diameter during and after the gelation process. For polymeric resins that gelate in acetone, such concentrations may be in a range of 3 to 12 wt %, a preferable concentration being 10 wt %. A concentration lower than 3 wt % will lead to insufficient strength of the spherical gel particles to retain the shape, while a concentration higher than 12 wt % may result in incomplete dissolution of the polymer in pure water.

Preferable examples of polymer compounds meeting these requirements and available commercially include polyvinyl alcohol (e.g. PVA-124H as the product name, Kuraray Co., Ltd., Japan) and a cationic derivative of cellulose (e.g. Leogard-G as the product name, Lion Corp., Japan).

The proportion of $Li_2CO_3$ powder to the carrier solution is preferably adjusted up to 4 weight parts of $Li_2CO_3$ to 10 weight parts of carrier solution. Although higher Li concentrations are desirable, a proportion of more than 4 parts of $Li_2CO_3$ to 10 parts of carrier solution leads to formation of slurry-like dispersion, thus making drop formation difficult.

The spherical gel particles formed in the solidifying bath contain uniformly dispersed $Li_2CO_3$ particles. The particles are dried retaining the spherical shape, and subsequently calcined preliminarily for more than 10 hours at a temperature in the range of 400° to 600° C., or preferably at 600° C., in air or other oxygen-containing atmosphere, yielding spherical $Li_2CO_3$ particles with the polymeric carrier gel completely removed.

These $Li_2CO_3$ particles are subsequently calcined in a furnace substantially in vacuo (preferably at an order of $10^{-4}$ Torr) for more than 60 hours at a temperature in the range of 400° to 700° C., or preferably at 700° C. The calcination decomposes $Li_2CO_3$ yielding $Li_2O$, thus converting the spherical $Li_2CO_3$ particles into spherical $Li_2O$ particles. Temperature is then further raised up to about 1100° C. at a rate of about 100° C./hr, and held at about 1100° C. for about 4 hours, yielding sintered spherical $Li_2O$ granules.

The invention can employ used $Li_2O$ granules as the starting material. For example, used $Li_2O$ granules are dissolved in nitric acid and reacted with soda ash to precipitate $Li_2CO_3$, which can be reused as the starting material for the method of the present invention.

The above and other features and advantages of the present invention will be elucidated further in terms of an embodiment of the invention described below, which is presented as an example and should not be considered to limit the scope of the invention, with reference to the accompanying drawings.

DESCRIPTION OF THE PREFERRED EMBODIMENT

Figure 1:
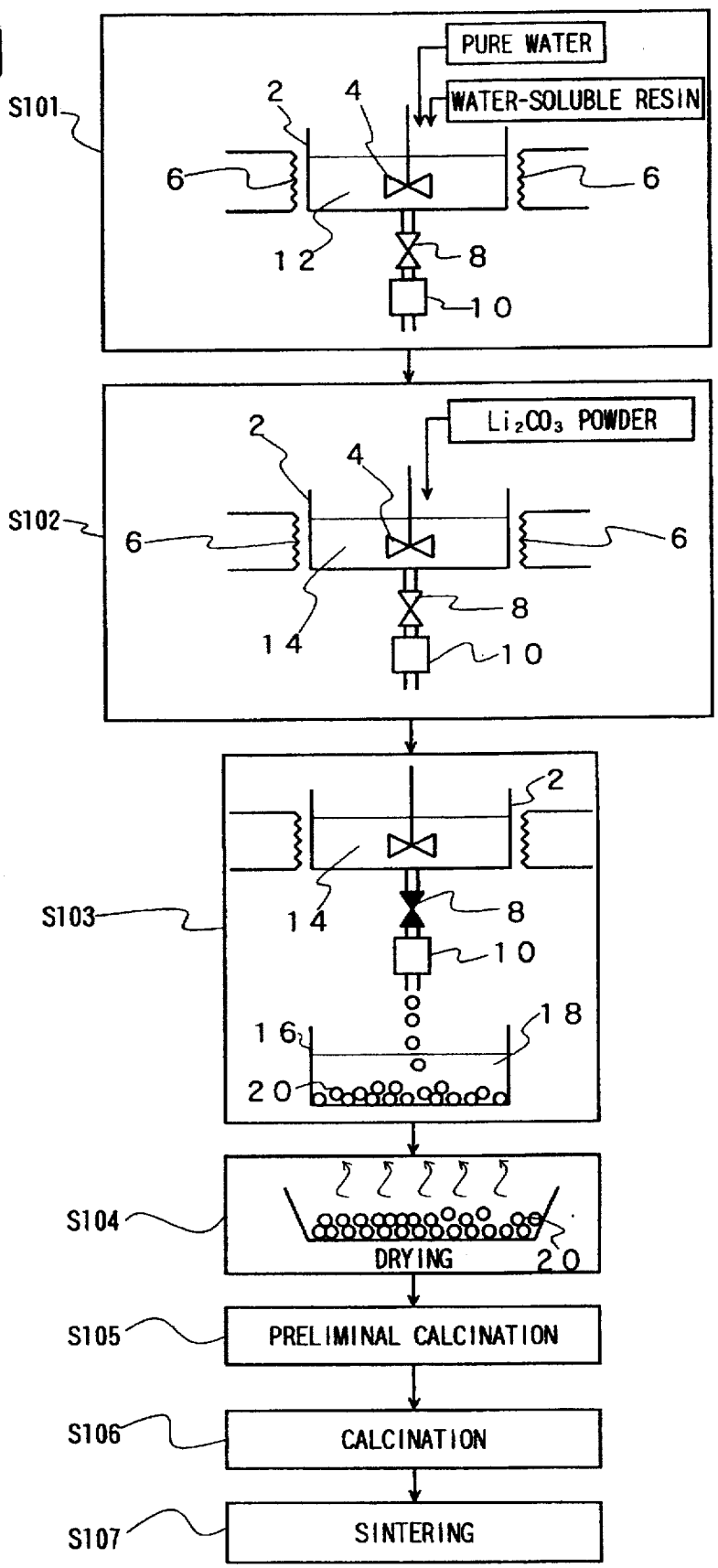
FIG. 1 shows a schematic flow of production process of sintered $Li_2O$ granules in accordance with an embodiment of the present invention.

FIG. 1 is a flow chart showing the production process of sintered $Li_2O$ granules in accordance with an embodiment of the invention. The embodiment employs $Li_2CO_3$ powder as the starting material, a cationic derivative of cellulose (Leogard-G as the product name, Lion Corp., Japan) as the polymeric compound to carry the $Li_2CO_3$ powder, and liquid acetone as the solidifying bath to form spherical gel particles. Polyvinyl alcohol (e.g. PVA-124H as product name, Kuraray Co., Ltd., Japan) may be used as the polymeric compound instead of said cationic derivative of cellulose.

In FIG. 1, a vessel 2 is equipped with an agitator 4, and a heater 6 is provided outside the vessel 2. A vibrating nozzle 10 is connected to the bottom of the vessel through a valve 8. The nozzle 10 can be forced to vibrate by means of a vibrator, not shown, at a desired frequency.

In the first step S101, pure water ($H_2O$) is poured into the vessel 2, to which said cationic derivative of cellulose is added. The mixture is agitated and heated by the agitator 4 and heater 6, respectively, to dissolve said cationic derivative of cellulose in the pure water, thus giving a 10% aqueous solution of the cationic derivative of cellulose (the carrier solution) 12.

In the next step S102, Li$_2$CO$_3$ powder is added to the carrier solution 12 and agitated by the agitator 4, producing a uniform dispersion 14 of the Li$_2$CO$_3$ powder, with a proportion of 4 weight parts of Li$_2$CO$_3$ to 10 weight parts of the carrier solution.

In step S103, an open vessel 16 is placed under the nozzle 10 of the vessel 2, in which vessel 16 liquid acetone 18 with a temperature adjusted to ambient temperature (about 25° C.) is placed. The valve 8 of the vessel 2 is opened, and the dispersion 14 in the vessel 2 is dripped through the vibrating nozzle 10 into the solidifying bath (acetone) 18 in the vessel 16 placed under the nozzle, to be turned into gel and to form spherical gel particles 20.

Figure 2:
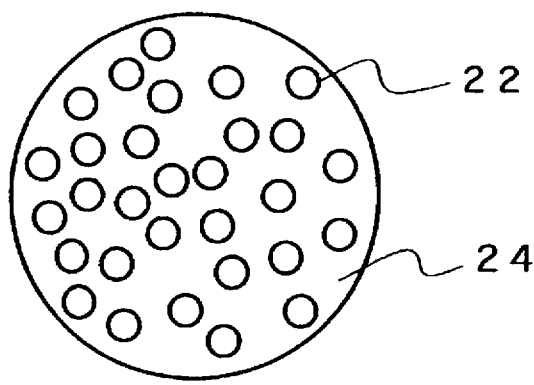
FIG. 2 shows a schematic structure model of a spherical gel particle containing dispersed $Li_2CO_3$ particles.

FIG. 2 shows schematically the structure of a spherical gel particle formed in acetone, which contains Li$_2$CO$_3$ powder 22 dispersed in the gel of the cationic derivative of cellulose 24.

In step S104, the spherical gel particles 20 are extracted from the acetone bath 18 and dried in air at about 50° C.

In step S105, the dried gel particles are preliminarily calcined in a firing furnace for more than 10 hours in air at 600° C., whereby spherical Li$_2$O$_3$ particles are obtained by nearly complete decomposition of the carrier, or the cationic derivative of cellulose 24. The temperature in the preliminary calcination should be maintained less than 720° C., or less than the melting point of Li$_2$CO$_3$.

In step S106, the furnace is evacuated to a pressure less than 10$^{-2}$ Torr, or preferably less than 10$^{-4}$ Torr, and further heated to about 700° C. for more than 6 hours, at which the spherical Li$_2$CO$_3$ particles are calcined. This decomposes Li$_2$CO$_3$ to Li$_2$O, and the spherical particles are eventually composed of Li$_2$O.

In the last step S107, the furnace is further heated to about 1000° C. at a rate of about 100° C./hr, and the spherical particles are sintered at 1100° C. for more than 4 hours, yielding spherical sintered Li$_2$O granules.

Figure 3:
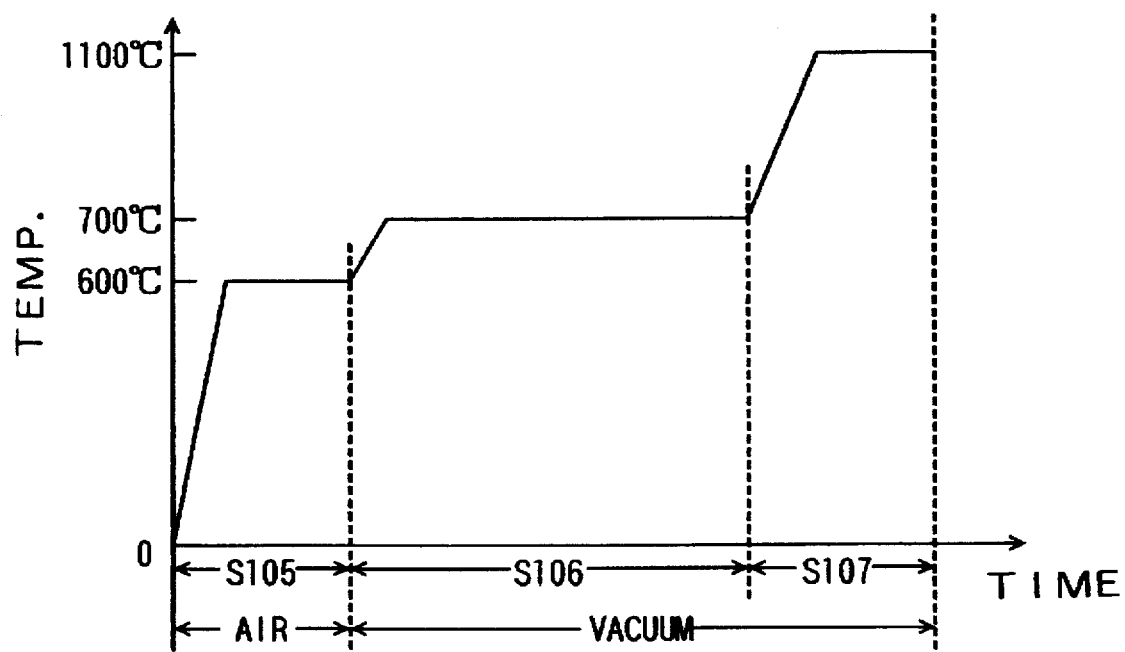
FIG. 3 illustrates graphically the firing condition in an embodiment of the invention.

FIG. 3 illustrates graphically the firing conditions in steps S105 to S107, where the ordinate represents the furnace temperature T, and the abscissa represents time. The corresponding steps S105, S106 and S107 are also shown together with atmosphere used (air or vacuum).

Grain size distribution and sphericity were measured for 1,000 sintered Li$_2$O granules thus obtained. For granules with a mean grain size of 1,013 μm, the standard deviation was 25 μm, and for granules with a mean grain size of 108 μm, the standard deviation was 5 μm. The small standard deviations indicate uniform grain sizes. The feasibility of producing sintered Li$_2$O granules 0.1 mm in diameter has thus been demonstrated.

Sphericity was evaluated for 1,000 granules by measuring major and minor axes and calculating major axis/minor axis ratios. The ratio for the granules according to this embodiment of the invention was 1.07 while that for the granules produced by a conventional process 1.10. Improvement in sphericity has thus been demonstrated.

What is claimed is:

1. A method for producing sintered Li$_2$O granules from powder of a Li compound, comprising the steps of:
   (a) preparing a dispersion of powder of said Li compound in an aqueous solution of a polymeric compound;
   (b) forming spherical drops of said dispersion by dripping said dispersion through a nozzle;
   (c) contacting said drops with a liquid which on contact with said aqueous solution of the polymeric compound causes said aqueous solution of a polymeric compound to gel, thereby forming spherical gel particles in which the powder of said Li compound is dispersed;
   (d) drying said spherical gel particles;
   (e) calcining said gel particles after drying to form spherical Li$_2$O particles; and
   (f) sintering said spherical Li$_2$O particles.

2. The method according to claim 1, wherein said Li compound is substantially insoluble in said aqueous solution of said polymeric compound.

3. The method according to claim 1, wherein said Li compound is selected from the group consisting of Li$_2$CO$_3$, LiOH and LiNO$_3$.

4. The method according to claim 1, wherein said Li compound is Li$_2$CO$_3$, and wherein said liquid is acetone.

5. The method according to claim 4, wherein said polymeric compound comprises a water-soluble resin.

6. The method according to claim 4, wherein said aqueous solution contains 3 to 12 wt % of said polymeric compound in pure water, said polymeric compound being dissolved in said pure water by heating.

7. The method according to claim 1, wherein said nozzle is forced to vibrate at a vibrating frequency, and wherein said vibrating frequency and/or the volumetric flow rate of said dispersion through said nozzle are adjusted to control the diameter of said drops.

8. The method according to claim 1, wherein said step of calcining said spherical gel particles is preceded by a preliminary step in which said spherical gel particles are preliminarily calcined at a temperature lower than the melting point of said Li compound in presence of oxygen to form spherical particles of said Li compound by eliminating said polymeric compound from said spherical gel particles.

9. The method according to claim 8, wherein said step of calcining said spherical gel particles is preceded by another step following said preliminary step, in which said spherical particles of said Li compound is thermally decomposed substantially in vacuo to form said spherical Li$_2$O particles.

10. The method of claim 4 wherein said polymeric compound is a cationic derivative of cellulose or polyvinyl alcohol.

11. The method of claim 7 wherein the size of the drops are controlled by controlling the volumetric flow rate through the nozzle and the frequency of vibration of the nozzle in accordance with the following relationship:

$$Q=(\pi/6)d^3*f$$

where Q is the volumetric flow rate of the dispersion discharged through the nozzle, d the drop diameter, and f the frequency of nozzle vibration.

12. A method for producing sintered Li$_2$O granules from powder of a Li compound, comprising the steps of:
   (a) mixing 3 to 12 wt %, of a water-soluble resin capable of gelation by acetone with pure water, heating the mixture and dissolving the resin to prepare a carrier solution;
   (b) preparing a dispersion of 4 weight parts or less of Li$_2$CO$_3$ powder in 10 weight parts of said carrier solution;
   (c) dripping drops of said dispersion into an acetone bath through a nozzle, whereby; said drops gel in said acetone bath to form spherical gel particles in which said Li$_2$CO$_3$ powder is dispersed in the gel;
   (d) drying said spherical gel particles by heating in air; thereafter (e) calcining said spherical $Li_2CO_3$ particles after drying for 10 hours or more at a temperature in the range of 400° to 600° C., to form spherical $Li_2CO_3$ particles;

(f) thermally decomposing said spherical gel particles substantially in vacuo for 60 hours or more at a temperature in the range of 400° to 700° C. to form spherical $Li_2O$ particles; and (g) subsequently raising the temperature at a rate of about 100° C./hr up to about 1100° C. and maintaining this temperature for about 4 hours to sinter said spherical $Li_2O$ particles.

13. The method according to claim 12, wherein said nozzle is forced to vibrate at a vibrating frequency, and wherein said frequency and/or the volumetric flow rate of said dispersion through said nozzle are adjusted to control the diameter of said drops.

14. The method of claim 12 wherein 10 wt % of the water-soluble resin is mixed.

15. The method of claim 12 wherein the water-soluble resin is a cationic derivative of cellulose or polyvinyl alcohol.

* * * * *